US008660303B2

(12) United States Patent
Izadi et al.

(10) Patent No.: US 8,660,303 B2
(45) Date of Patent: Feb. 25, 2014

(54) DETECTION OF BODY AND PROPS

(75) Inventors: Shahram Izadi, Cambridge (GB); Jamie Shotton, Cambridge (GB); John Winn, Cambridge (GB); Antonio Criminisi, Hardwick (GB); Otmar Hilliges, Cambridge (GB); Mat Cook, Cambridge (GB); David Molyneaux, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 12/972,837

(22) Filed: Dec. 20, 2010

(65) Prior Publication Data

US 2011/0085705 A1 Apr. 14, 2011

Related U.S. Application Data

(63) Continuation-in-part of application No. 12/454,628, filed on May 20, 2009, now Pat. No. 8,503,720.

(60) Provisional application No. 61/174,878, filed on May 1, 2009.

(51) Int. Cl.
*G06K 9/00* (2006.01)
*G06K 9/62* (2006.01)
*G06K 9/36* (2006.01)

(52) U.S. Cl.
USPC ............................ 382/103; 382/224; 382/291

(58) Field of Classification Search
USPC ......... 382/100, 103–106, 159, 170–173, 181, 382/190, 195, 203, 209–210, 226, 228, 241, 382/266, 276–278, 285, 293; 345/156, 158, 345/473–474, 143, 418–419, 629; 463/32, 463/36, 31, 37, 42, 5, 8; 704/231, E15.005, 704/E15.004; 356/614, 616; 701/24; 715/700, 702, 863; 348/135, 169, 154, 348/19, E7.085
See application file for complete search history.

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Toyama, Kentaro, et al., "Probabilistic Tracking in a Metric Space," Eighth International Conference on Computer Vision, Vancouver, Canada, vol. 2, Jul. 2001, 8 pages.
Bobic, Nick. "Rotating Objects Using Quaternions." Gamasutra [online], Jul. 5, 1998, pp. 1-5. Retrieved from the Internet on Aug. 20, 2010: URL: <http://www.gamasutra.com/view/feature/3278/rotating_objects_using_quaternions.php?page=2>.
"The Case for Kinect." Eurogamer [online], Aug. 7, 2007, pp. 1-7. Retrieved from the Internet on Aug. 20, 2010: URL: <http://www.eurogamer.net/articles/digitalfoundry-the-case-for-kinect-article?page=2>.

(Continued)

*Primary Examiner* — Hadi Akhavannik
*Assistant Examiner* — Mehdi Rashidian
(74) *Attorney, Agent, or Firm* — Judy Yee; Peter Taylor; Micky Minhas

(57) ABSTRACT

A system and method for detecting and tracking targets including body parts and props is described. In one aspect, the disclosed technology acquires one or more depth images, generates one or more classification maps associated with one or more body parts and one or more props, tracks the one or more body parts using a skeletal tracking system, tracks the one or more props using a prop tracking system, and reports metrics regarding the one or more body parts and the one or more props. In some embodiments, feedback may occur between the skeletal tracking system and the prop tracking system.

20 Claims, 13 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,856,827 B2 | 2/2005 | Seeley et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,212,665 B2 | 5/2007 | Yang et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 * | 1/2008 | Fujimura et al. .............. 382/203 |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |

(56) References Cited

U.S. PATENT DOCUMENTS

| | | | |
|---|---|---|---|
| 7,627,139 B2 * | 12/2009 | Marks et al. | 382/103 |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2004/0046736 A1 * | 3/2004 | Pryor et al. | 345/156 |
| 2008/0026838 A1 | 1/2008 | Dunstan et al. | |
| 2009/0175540 A1 * | 7/2009 | Dariush et al. | 382/195 |
| 2009/0252423 A1 * | 10/2009 | Zhu et al. | 382/209 |
| 2012/0280897 A1 * | 11/2012 | Balan et al. | 345/156 |
| 2013/0136358 A1 * | 5/2013 | Dedhia et al. | 382/173 |

FOREIGN PATENT DOCUMENTS

| | | | |
|---|---|---|---|
| JP | 08044490 A1 | 2/1996 | |
| WO | 93/10708 A1 | 6/1993 | |
| WO | 97/17598 A1 | 5/1997 | |
| WO | 99/44698 A1 | 9/1999 | |

OTHER PUBLICATIONS

Crawford, Stephanie. "How Microsoft Kinect Works," Howstuffworks [online], pp. 1-4. Retrieved from the Internet on Aug. 19, 2010: URL: <http://electronics.howstuffworks.com/microsoft-kinect.htm/printable>.

Fitzgerald, et al. "Integration if kinematic Analysis into Computer Games for Exercise." Proceedings of CGAMES 2006—9th International Conference on Computer Games: AI, Animation, Mobile, Educational and Serious Games, Nov. 22-26, 2006, pp. 24-28, Dublin, Ireland.

"Kinect is your personal trainer in EA Sports Active 2." Gamerss [online]. Jul. 26, 2010. Retrieved from the Internet on Aug. 20, 2010: URL: <http://www.gamerss.co.uk/kinect-is-your-personal-trainer-in-ea-sports-active-2>.

Parrish, Kevin. "Microsoft Does Want Core Games, FPS for Kinect." Tom's Guide: Tech for Real Life [online], Jun. 23, 2010, pp. 1-5. Retrieved from the Internet on Aug. 20, 2010: URL: <http://www.tomsguide.com/us/Core-Gamers-Kinect-FPS-Action,news-7195.html>.

Tresadern, Philip A. "Visual Analysis of Articulated Motion." DPhil Thesis, University of Oxford, Oct. 12, 2006, pp. 1-171. Oxford, U.K.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

\* cited by examiner

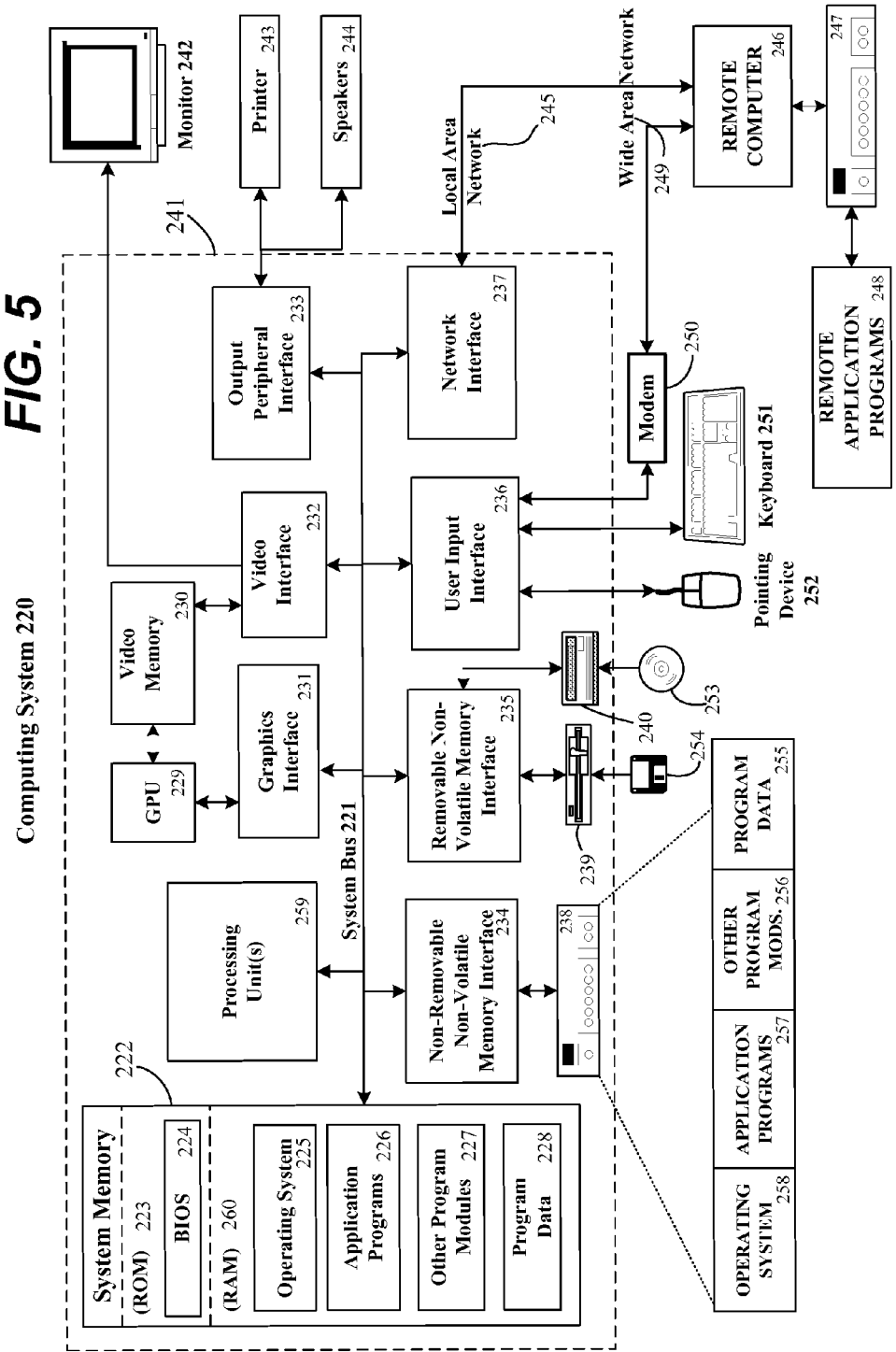

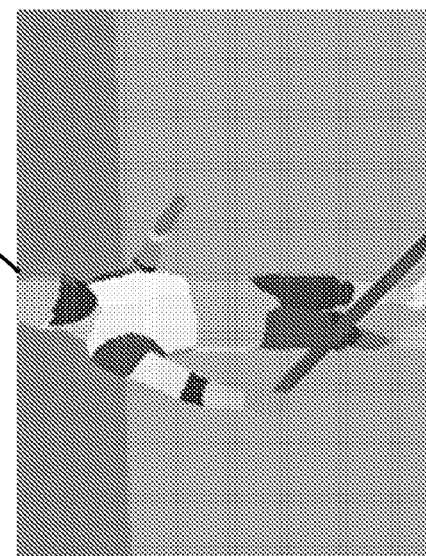
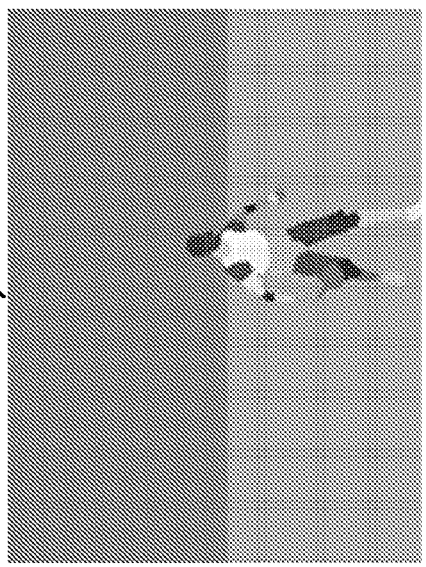
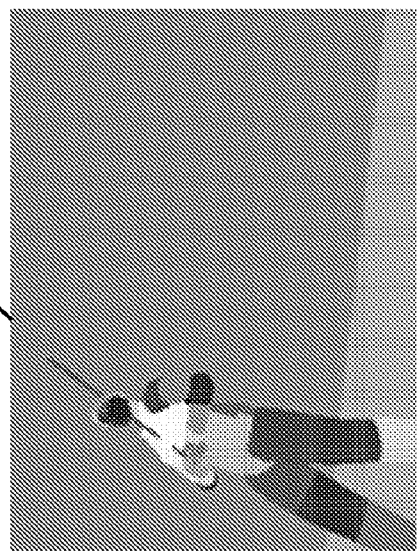
FIG. 8

Original depth image

Segmented image predicting body parts and props

Original image   Segmented image

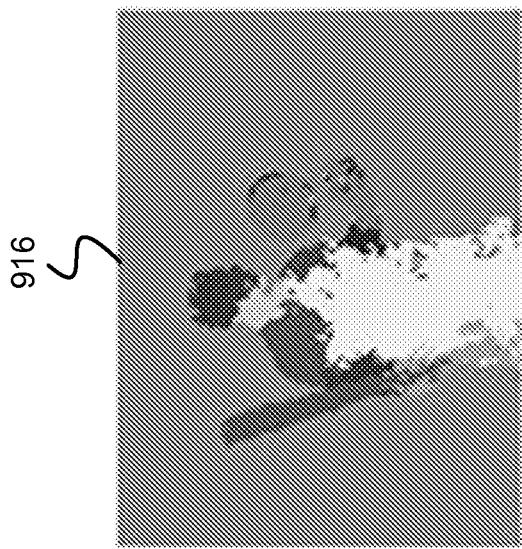
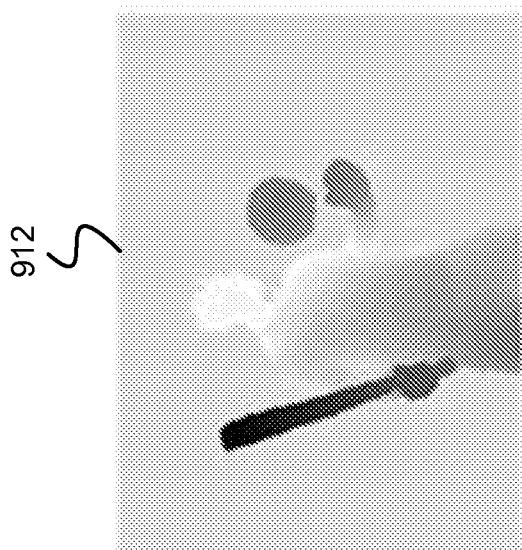
FIG. 9C

DETECTION OF BODY AND PROPS

CLAIM OF PRIORITY

The present application claims priority to U.S. patent application Ser. No. 12/454,628, entitled "Human Body Pose Estimation," filed May 20, 2009, which claims priority to Provisional Patent Application No. 61/174,878, entitled "Human Body Pose Estimation," filed May 1, 2009. Each of the aforementioned applications is herein incorporated by reference in its entirety.

BACKGROUND

In a typical computing environment, users of a computing application, such as a multimedia application or a computer game, use an input device to control aspects of the computing application. Common input devices used to control a computing application include a controller, keyboard, joystick, remote, mouse, or the like. More recently, computing applications have begun employing cameras and gesture recognition software to provide a natural user interface. With a natural user interface, a user's body parts and movements may be detected, interpreted, and used to control game characters or other aspects of a computing application.

SUMMARY

Technology is described for detecting, analyzing, and tracking targets including body parts and props. In one embodiment, a natural user interface system includes a target detection and tracking system. In one embodiment, the target detection and tracking system includes a target proposal system and a target tracking system. The target proposal system identifies one or more candidate body parts and one or more candidate prop locations within a particular field of view. In one example, the target proposal system assigns to one or more pixels in a particular depth image a probability of belonging to one or more candidate body parts and/or props. Because the target proposal system may produce many false positives, the target tracking system is used to reconcile the one or more candidate body parts and/or props and output correctly identified body parts and/or props.

In one embodiment, the disclosed technology acquires one or more depth images, generates one or more classification maps associated with one or more body parts and one or more props, tracks the one or more body parts using a skeletal tracking system, tracks the one or more props using a prop tracking system, and reports metrics regarding the one or more body parts and the one or more props. In some embodiments, feedback may occur between the skeletal tracking system and the prop tracking system.

In some embodiments, the physical movements of one or more game players holding one or more props (e.g., gaming props such as a plastic toy sword or guitar) are tracked and interpreted as real-time user controls that adjust and/or control parts of an electronic game. For example, a game player holding a real tennis racquet or similar physical object while playing a virtual tennis game may control in real-time a virtual racquet in game space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates an example of a computing environment in accordance with embodiments of the present disclosure.

FIG. 8 depicts three training images that have been retrofitted with 3-D models.

FIGS. 9A-9C depict depth images and corresponding segmented images.

DETAILED DESCRIPTION

Technology is described for detecting, analyzing, and tracking targets including body parts and props. In one embodiment, a natural user interface system includes a target detection and tracking system. In one embodiment, the target detection and tracking system includes a target proposal system and a target tracking system. The target proposal system identifies one or more candidate body parts and one or more candidate prop locations within a particular field of view. In one example, the target proposal system assigns to one or more pixels in a particular depth image a probability of belonging to one or more candidate body parts and/or props. Because the target proposal system may produce many false positives, the target tracking system is used to reconcile the one or more candidate body parts and/or props and output correctly identified body parts and/or props.

Figure 1A:
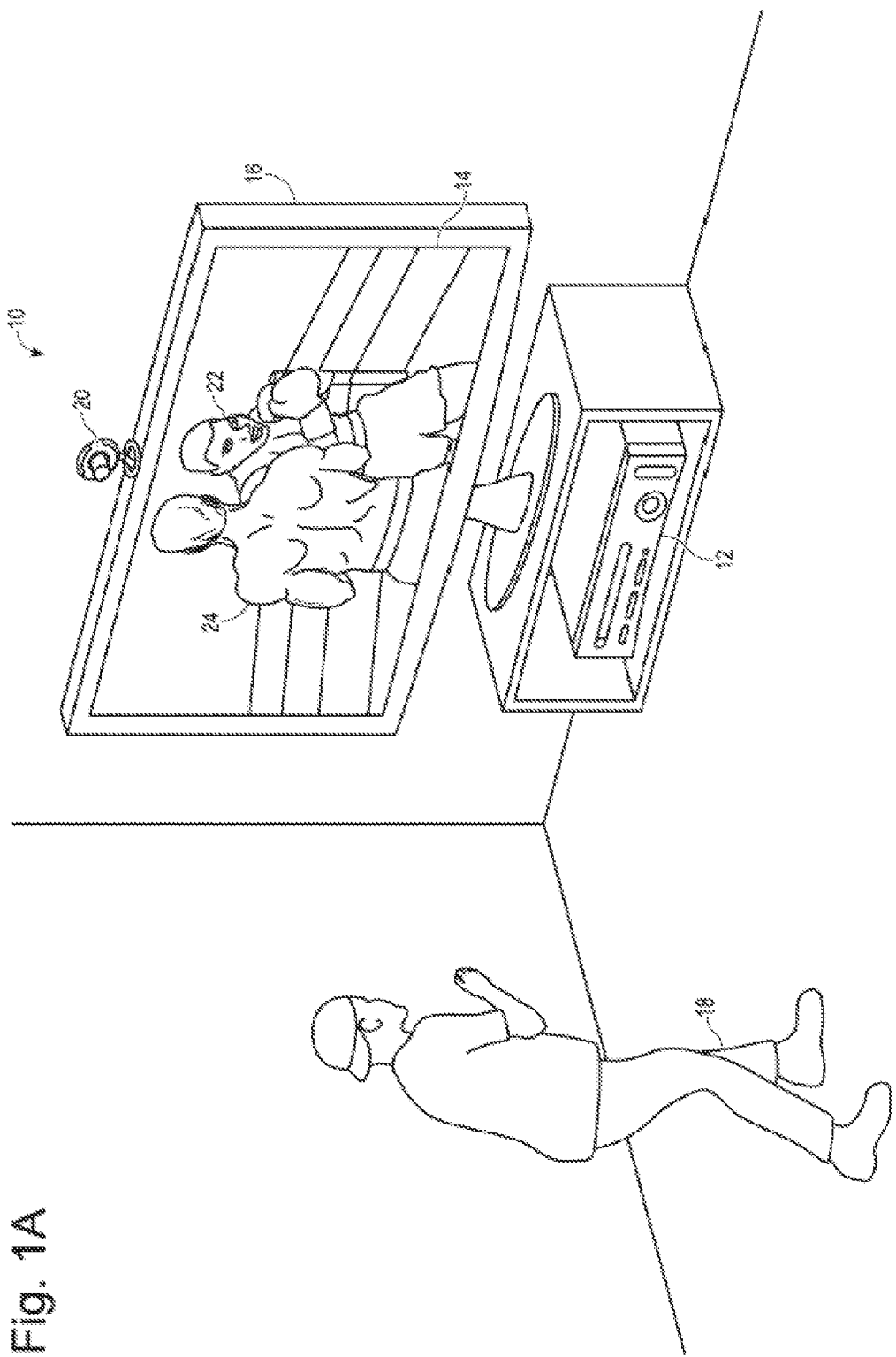
FIGS. 1A and 1B depict one embodiment of a target detection and tracking system tracking a user.
Figure 1B:
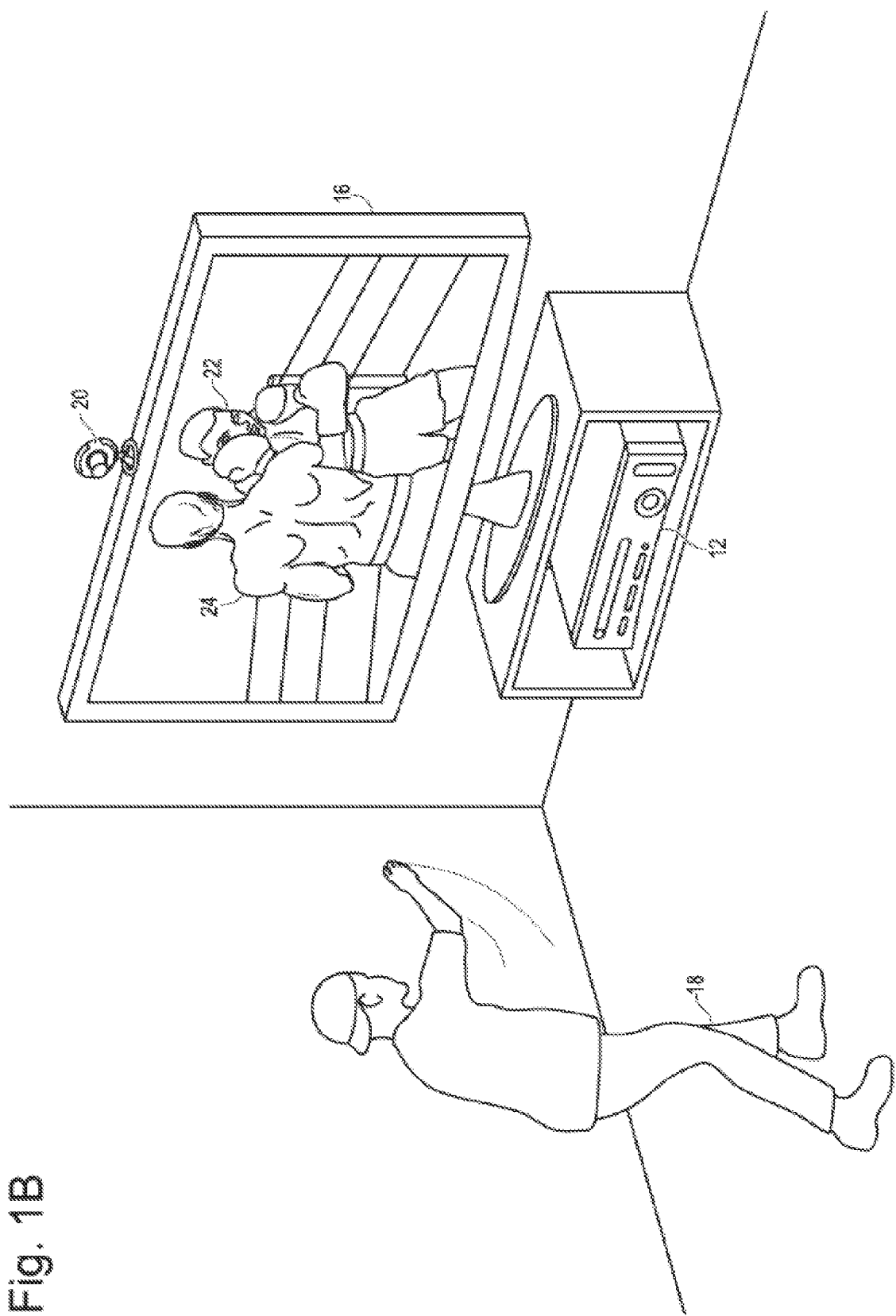

FIGS. 1A and 1B depict one embodiment of a target detection and tracking system 10 with a user 18 playing a boxing game. The target detection and tracking system 10 may be used to detect, recognize, analyze, and/or track human targets, such as user 18, and/or non-human targets, such as a prop held by user 18 (not shown).

As shown in FIG. 1A, the target detection and tracking system 10 may include a computing environment 12. The computing environment 12 may include a computer, a gaming system or console, or the like. In one embodiment, the computing environment 12 may include hardware components and/or software components such that the computing environment 12 may be used to execute an operating system and applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, the target detection and tracking system 10 may further include a capture device 20. In one embodiment, capture device 20 may include a camera that may be used to visually monitor one or more targets including one or more users, such as the user 18. Gestures (including poses) performed by the one or more users may be captured, analyzed, and tracked to perform one or more controls or actions for the user-interface of an operating system or application.

Through moving his or her body, a user may create gestures. A gesture may comprise a motion or pose by a user that may be captured as image data and parsed for meaning. A gesture may be dynamic, comprising a motion, such as mimicking throwing a ball. A gesture may be a static pose, such as holding one's forearms crossed. A gesture may also incorporate props, such as swinging a mock sword.

In one embodiment, capture device 20 may capture image and audio data relating to one or more users and/or objects. For example, capture device 20 may be used to capture information relating to partial or full body movements, gestures, and speech of one or more users. The information captured by capture device 20 may be received by computing environment 12 and/or a processing element within capture device 20 and used to render, interact with, and control aspects of a gaming or other application. In one example, capture device 20 captures image and audio data relating to a particular user and computing environment 12 processes the captured information to identify the particular user by executing facial and voice recognition software.

In one embodiment, the target detection and tracking system 10 may be connected to an audiovisual device 16 such as a television, a monitor, a high-definition television (HDTV), or the like that may provide game or application visuals and/or audio to a user such as user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may output the game or application visuals and/or audio associated with the audiovisual signals to the user 18. In one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the application executing on the computing environment 12 may be a boxing game that the user 18 may be playing. The computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. In one embodiment, the computer environment 12 and the capture device 20 of the target detection and tracking system 10 may be used to recognize and analyze the punch of the user 18 in physical space such that the punch may be interpreted as a game control of the player avatar 24 in game space.

In one embodiment, a user's movements may be interpreted as controls that may correspond to actions other than controlling the player avatar 24. For example, a user 18 may use movements to end a game, pause a game, save a game, select a level, view high scores, communicate with a friend, etc. In another embodiment, target detection and tracking system 10 interprets a target's movements as operating system and/or application controls that are outside the realm of games. For example, virtually any controllable aspect of an operating system and/or application may be controlled by movements of the target such as the user 18. In another embodiment, the user 18 may use movements to select the game or other application from a main user interface. A full range of motion of the user 18 may be available, used, and analyzed in any suitable manner to interact with an application or operating system.

Figure 1C:
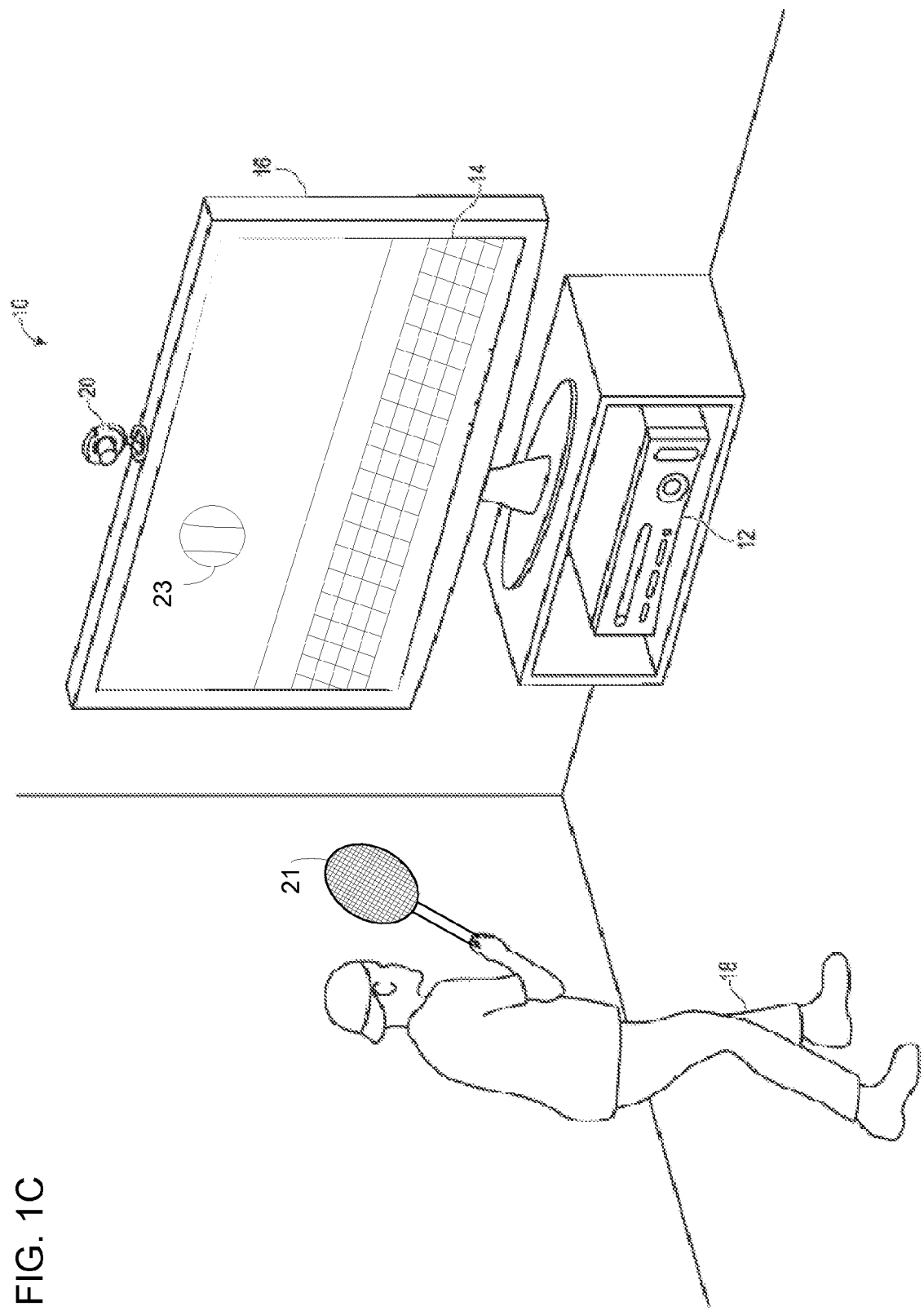
FIG. 1C depicts one embodiment of a target detection and tracking system tracking a user.

As shown in FIG. 1C, a human target such as the user 18 may hold an object such as racket 21. In one embodiment, the user 18 can hold an object such as a prop when interacting with an application. In such embodiments, the movement of both the person and the object may be used to control an application. For example, the motion of a player holding racket 21 may be tracked and used for controlling an on-screen ball 23 in an application which simulates a tennis game. In another embodiment, the motion of a player holding a toy weapon such as a plastic sword may be tracked and used for controlling a corresponding weapon in an electronic combat game. In some embodiments, other objects may also be tracked including one or more gloves, balls, bats, clubs, guitars, microphones, sticks, pets, animals, drums, and the like. The objects being tracked may closely map to a particular game or application (e.g., a real tennis racquet used in a virtual tennis game) or may be a more abstract representation (e.g., a torch, or flash light, representing a light saber).

In some embodiments, one or more objects being tracked by target detection and tracking system 10 may be active objects. Active objects may include one or more sensors to provide information to target detection and tracking system 10 such as acceleration or orientation information. In contrast, passive objects do not provide additional information to the target detection and tracking system 10. The ability to combine visual tracking information with real-time position, acceleration, and/or orientation information from an active object may allow target detection and tracking system 10 to improve its target tracking capability, especially when a capture device is capturing high-speed movements where motion blur may be an issue (e.g., the swinging of a baseball bat). In one embodiment, a gaming prop includes an accelerometer, a magnetometer, and a gyroscope and transmits acceleration, magnetic field, and orientation information to a target detection and tracking system.

In some embodiments, one or more objects being tracked by target detection and tracking system 10 may be passive objects. In one embodiment, a passive object may be augmented with one or more markers such as an IR retroreflective marker to improve object detection and tracking. In another embodiment, passive and active gaming props may be augmented with one or more IR retroreflective markers.

Suitable examples of a target detection and tracking system 10 and components thereof are found in the following co-pending patent applications, all of which are herein incorporated by reference: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb.

23, 2009; and U.S. patent application Ser. No. 12/474,655, entitled "Gesture Tool," filed May 29, 2009.

Figure 2:
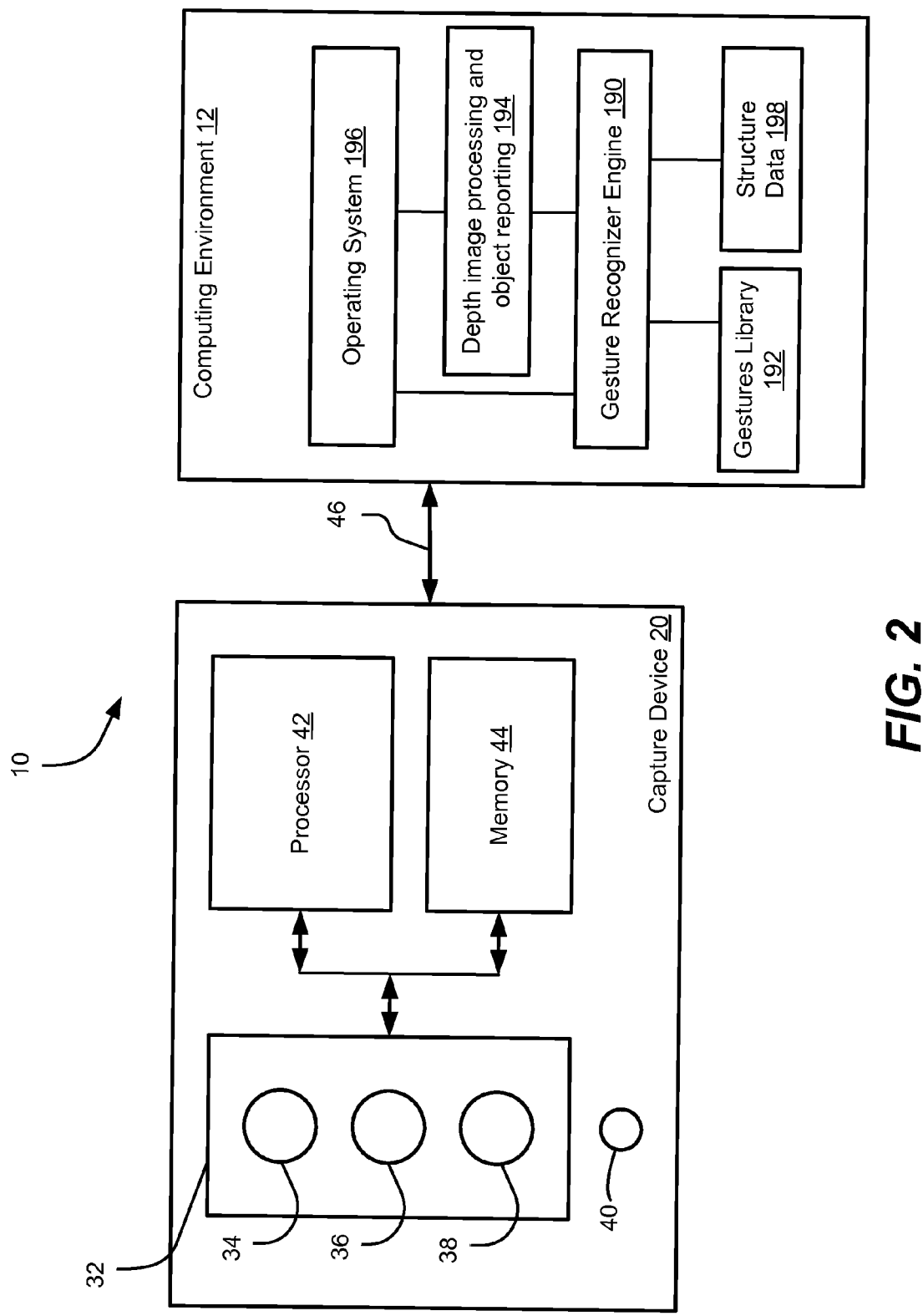
FIG. 2 depicts one embodiment of a target detection and tracking system.

FIG. 2 illustrates one embodiment of a target detection and tracking system 10 including a capture device 20 and computing environment 12 that may be used to recognize human and non-human targets in a capture area (with or without special sensing devices attached to the subjects), uniquely identify them, and track them in three dimensional space. In one embodiment, the capture device 20 may be a depth camera (or depth sensing camera) configured to capture video with depth information including a depth image that may include depth values via any suitable technique including, for example, time-of-flight, structured light, stereo image, or the like. In one embodiment, the capture device 20 may include a depth sensing image sensor. In one embodiment, the capture device 20 may organize the calculated depth information into "Z layers," or layers that may be perpendicular to a Z-axis extending from the depth camera along its line of sight.

As shown in FIG. 2, the capture device 20 may include an image camera component 32. In one embodiment, the image camera component 32 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, the image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiment, capture device 20 may include an IR CMOS image sensor. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

In one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets (or objects) in the capture area, the pattern may become deformed in response. Such a deformation of the pattern may be captured by, for example, the 3-D camera 36 and/or the RGB camera 38 and analyzed to determine a physical distance from the capture device to a particular location on the targets or objects.

In some embodiments, two or more different cameras may be incorporated into an integrated capture device. For example, a depth camera and a video camera (e.g., an RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As shown in FIG. 2, capture device 20 may include a microphone 40. The microphone 40 may include a transducer or sensor that may receive and convert sound into an electrical signal. In one embodiment, the microphone 40 may be used to reduce feedback between the capture device 20 and the computing environment 12 in the target detection and tracking system 10. Additionally, the microphone 40 may be used to receive audio signals that may also be provided by the user to control applications such as game applications, non-game applications, or the like that may be executed by the computing environment 12.

In one embodiment, the capture device 20 may include a processor 42 that may be in operative communication with the image camera component 32. The processor 42 may include a standardized processor, a specialized processor, a microprocessor, or the like. The processor 42 may execute instructions that may include instructions for storing profiles, receiving the depth image, determining whether a suitable target may be included in the depth image, converting the suitable target into a skeletal representation or model of the target, or any other suitable instructions.

It is to be understood that at least some target analysis and tracking operations may be executed by processors contained within one or more capture devices. A capture device may include one or more onboard processing units configured to perform one or more target analysis and/or tracking functions. Moreover, a capture device may include firmware to facilitate updating such onboard processing logic.

As shown in FIG. 2, the capture device 20 may include a memory component 44 that may store the instructions that may be executed by the processor 42, images or frames of images captured by the 3-D camera or RGB camera, user profiles or any other suitable information, images, or the like. In one example, the memory component 44 may include random access memory (RAM), read only memory (ROM), cache, Flash memory, a hard disk, or any other suitable storage component. As shown in FIG. 2, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

As shown in FIG. 2, the capture device 20 may be in communication with the computing environment 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46.

In one embodiment, the capture device 20 may provide the depth information and images captured by, for example, the 3-D camera 36 and/or the RGB camera 38 to the computing environment 12 via the communication link 46. The computing environment 12 may then use the depth information and captured images to, for example, create a virtual screen, adapt the user interface and control an application such as a game or word processor.

As shown in FIG. 2, computing environment 12 includes gestures library 192, structure data 198, gesture recognition engine 190, depth image processing and object reporting module 194, and operating system 196. Depth image processing and object reporting module 194 uses the depth images to track the motion of objects, such as the user and other objects. To assist in the tracking of the objects, depth image processing and object reporting module 194 uses gestures library 190, structure data 198 and gesture recognition engine 190.

In one example, structure data 198 includes structural information about objects that may be tracked. For example, a skeletal model of a human may be stored to help understand movements of the user and recognize body parts. In another example, structural information about inanimate objects, such as props, may also be stored to help recognize those objects and help understand movement.

In one example, gestures library 192 may include a collection of gesture filters, each comprising information concerning a gesture that may be performed by the skeletal model. A gesture recognition engine 190 may compare the data captured by capture device 20 in the form of the skeletal model and movements associated with it to the gesture filters in the gesture library 192 to identify when a user (as represented by the skeletal model) has performed one or more gestures. Those gestures may be associated with various controls of an application. Thus, the computing environment 12 may use the gesture recognition engine 190 to interpret movements of the skeletal model and to control operating system 196 or an application based on the movements.

In one embodiment, depth image processing and object reporting module 194 will report to operating system 196 an identification of each object detected and the position and/or orientation of the object for each frame. Operating system 196 will use that information to update the position or movement of an object (e.g., an avatar) or other images in the display or to perform an action on the provided user-interface.

More information about gesture recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety.

Figure 3:
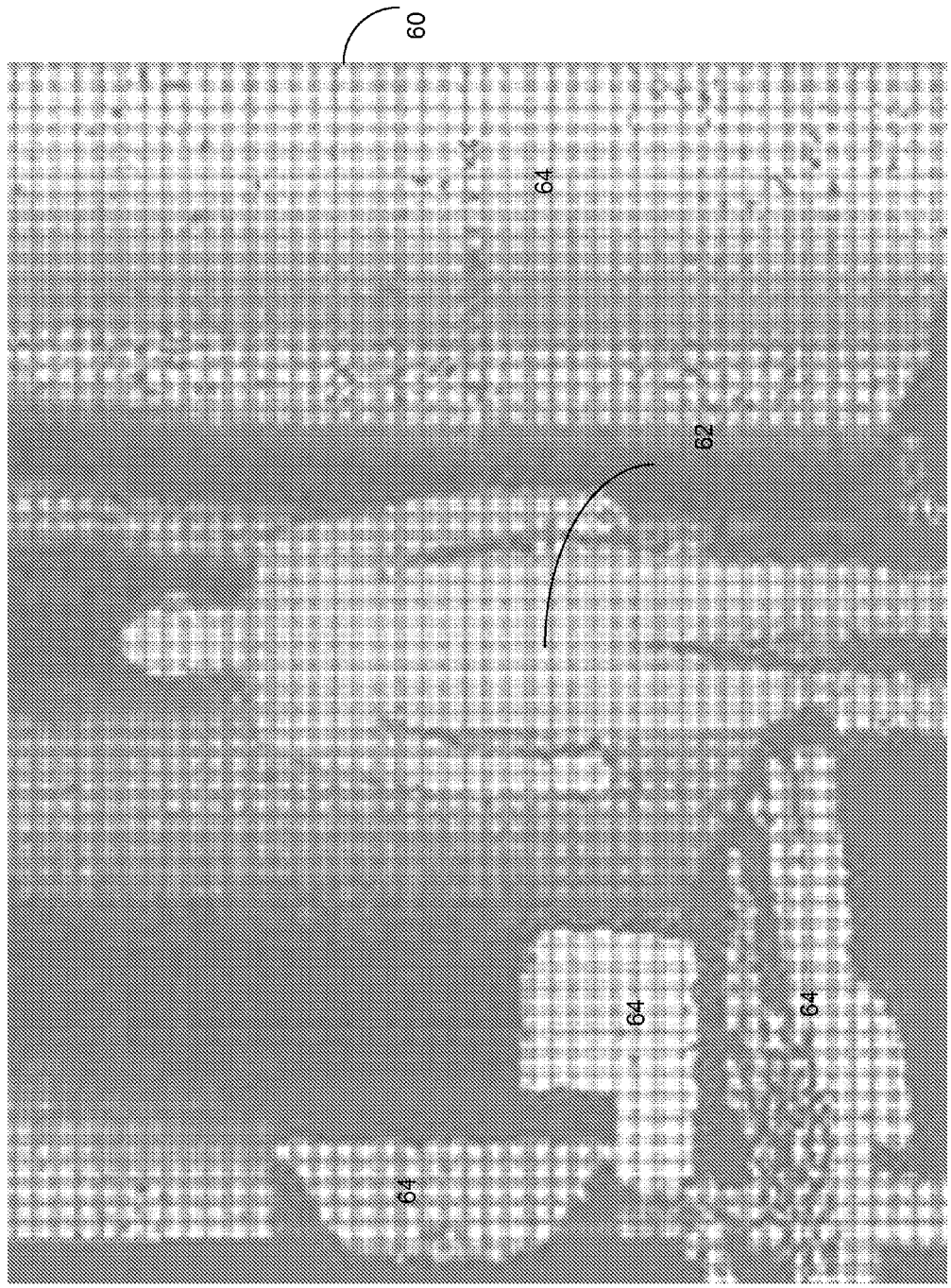
FIG. 3 illustrates an example embodiment of a depth image.

FIG. 3 illustrates an example embodiment of a depth image 60 that may be received by a target detection and tracking system, such as target detection and tracking system 10 and/or the computing environment 12 of FIGS. 1A-1C. In one embodiment, the depth image 60 may be an image or frame of a scene captured by, for example, the 3-D camera 36 and/or the RGB camera 38 of the capture device 20 described above with respect to FIG. 2. As shown in FIG. 3, the depth image 60 may include a human target 62 and one or more non-human targets 64 such as a wall, a table, a monitor, or the like in the captured scene. In one example, the depth image 60 may include a plurality of observed pixels where each observed pixel has an associated depth value. For example, the depth image 60 may include a two-dimensional (2-D) pixel area of the captured scene where each pixel in the 2-D pixel area may represent a depth value such as a length or distance in, for example, centimeters, millimeters, or the like of a target or object in the captured scene from the capture device.

Referring back to FIG. 2, in one embodiment, upon receiving the depth image, the depth image may be downsampled to a lower processing resolution such that the depth image may be more easily used and/or more quickly processed with less computing overhead. Additionally, one or more high-variance and/or noisy depth values may be removed and/or smoothed from the depth image and portions of missing and/or removed depth information may be filled in and/or reconstructed. In one embodiment, a depth image such as depth image 60 may be downsampled as used in combination with an image from an RGB camera such as camera 38, or an image captured by any other detector, in order to determine the shape and size of a target.

Figure 4:
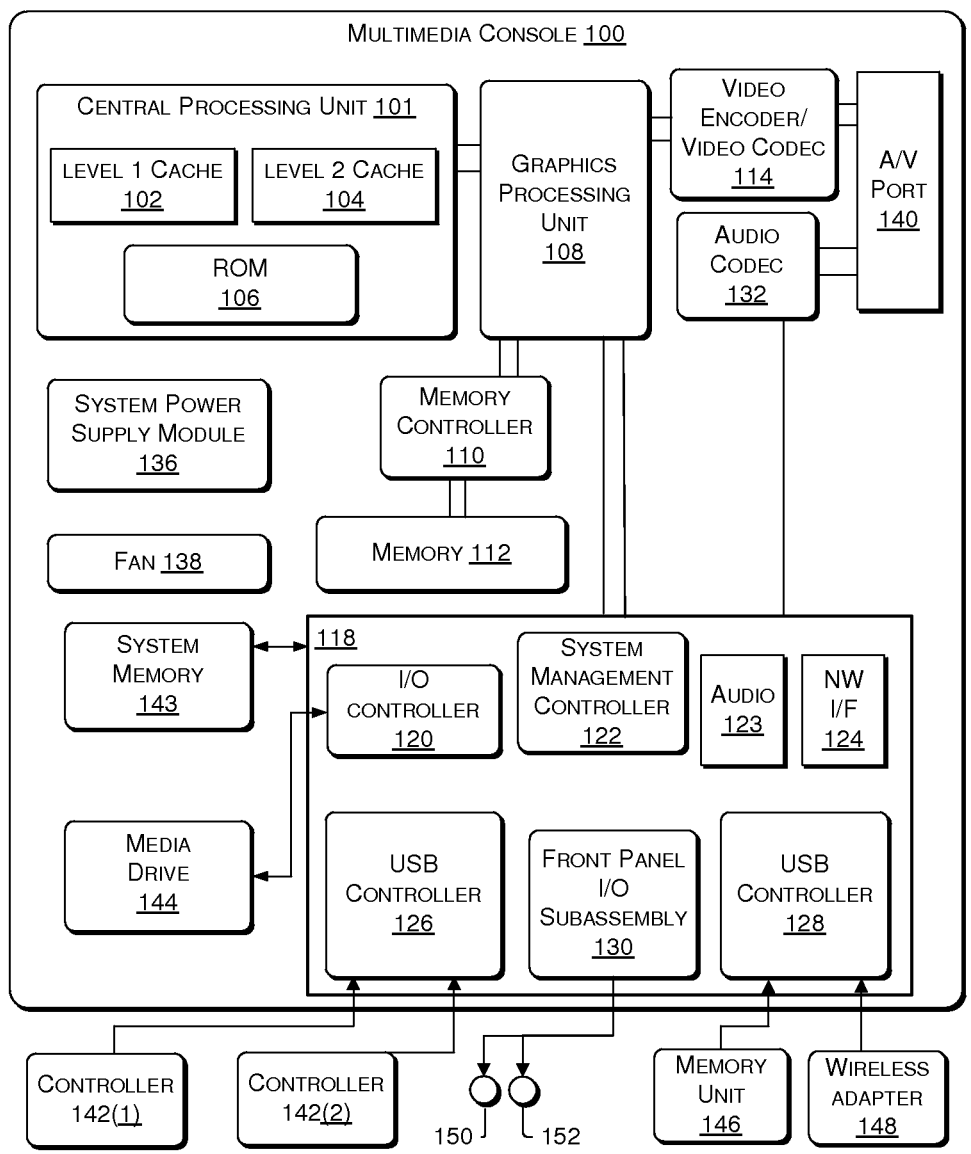
FIG. 4 illustrates an example of a computing environment in accordance with embodiments of the present disclosure.

FIG. 4 illustrates an example of a computing environment including a multimedia console (or gaming console) 100 that may be used to implement the computing environment 12 of FIG. 2. As shown in FIG. 4, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. In some embodiments, the capture device 20 of FIG. 2 may be an additional input device to multimedia console 100.

FIG. 5 illustrates another example of a computing environment that may be used to implement the computing environment 12 of FIG. 2. The computing environment of FIG. 5 is only one example of a suitable computing environment and is not intended to suggest any limitation as to the scope of use or functionality of the presently disclosed subject matter. Neither should the computing environment 12 of FIG. 2 be interpreted as having any dependency or requirement relating to any one or combination of components illustrated in the exemplary operating environment of FIG. 5. In some embodiments, the various depicted computing elements may include circuitry configured to instantiate specific aspects of the present disclosure. For example, the term circuitry used in the disclosure can include specialized hardware components configured to perform function(s) by firmware or switches. In other examples, the term circuitry can include a general-purpose processing unit, memory, etc., configured by software instructions that embody logic operable to perform function(s). In embodiments where circuitry includes a combination of hardware and software, an implementer may write source code embodying logic and the source code can be compiled into machine readable code that can be processed by the general purpose processing unit.

In FIG. 5, the computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 5 illustrates operating system 225, application programs 226, other program modules 227, and program data 228.

The computer 241 may also include other removable/non-removable, volatile/nonvolatile computer storage media. By way of example, FIG. 5 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 5, provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 34, 36 and capture device 20 of FIG. 2 may define additional input devices for the computer 241. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted in FIG. 5 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates remote application programs 248 as residing on memory device 247. It will be appreciated that the network connections shown are exemplary and other means of establishing a communications link between the computers may be used.

In one embodiment, computing system 220 may be configured to represent each target with a model. As described in more detail below, information derived from such a model can be compared to information obtained from a capture device, such as a depth camera, so that the fundamental proportions or shape of the model, as well as its current pose, can be adjusted to more accurately represent the modeled target. The model may be represented by one or more polygonal meshes, by a set of mathematical primitives, and/or via other suitable machine representations of the modeled target.

Figure 6A:
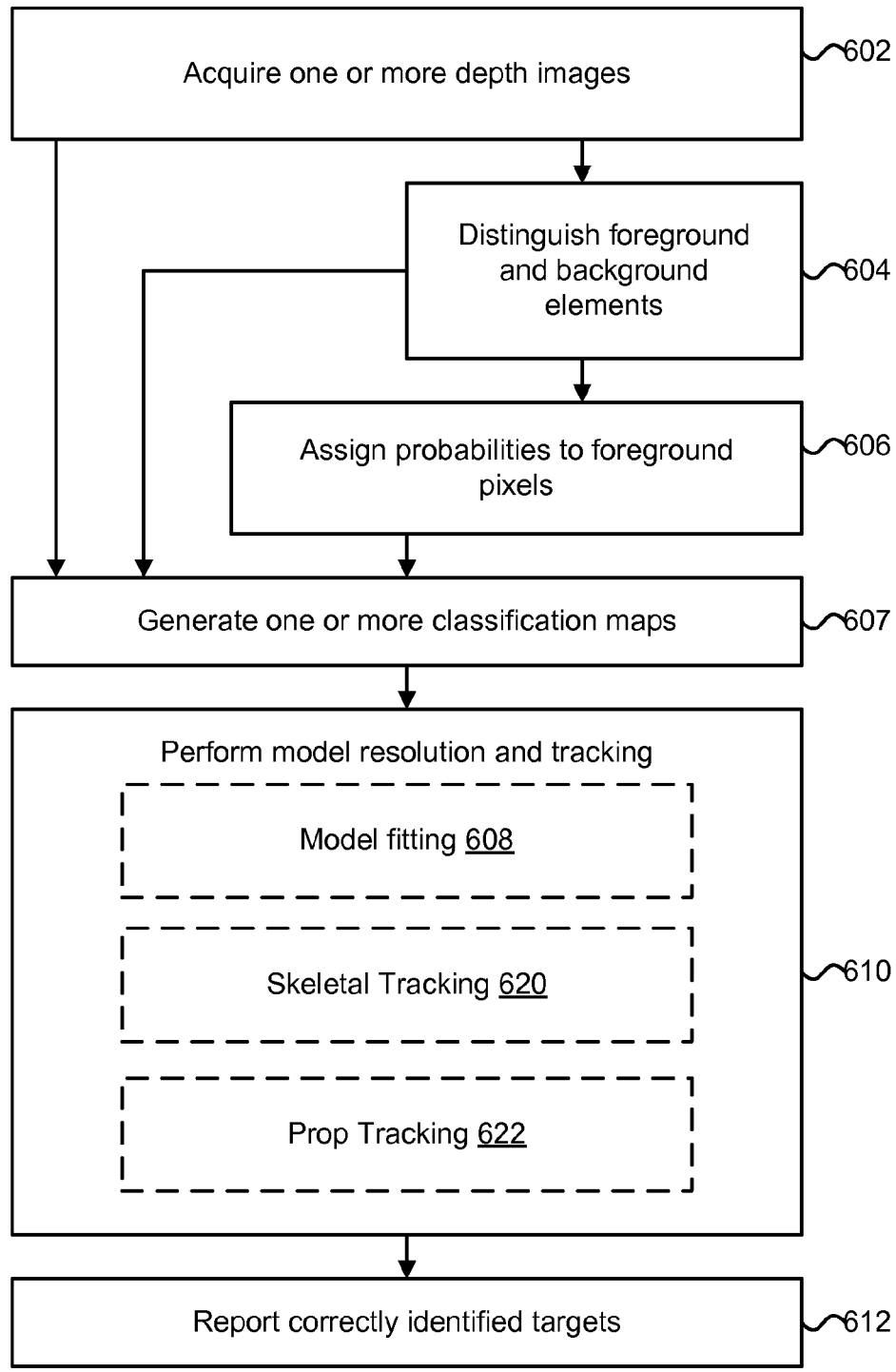
FIG. 6A is a flowchart describing one embodiment of a process for detecting and tracking one or more targets.

FIG. 6A is a flowchart describing one embodiment of a process for detecting and tracking one or more targets. In some embodiments, the one or more targets may include body parts of human game players and props. In some embodiments, a particular target of the one or more targets may represent the combination of a body part and prop. For example, a particular target may include a baseball glove and an upper portion of a forearm.

The process of FIG. 6A may be performed by one or more computing devices. Each step in the process of FIG. 6A may be performed by the same or different computing devices as those used in other steps, and each step need not necessarily be performed by a single computing device. In one embodiment, the process of FIG. 6A is performed by a computing environment such as computing environment 12 in FIG. 2.

In step 602, one or more depth images are acquired from a source such as capture device 20 in FIG. 2. In some embodiments, the source may be a depth camera configured to obtain depth information about the target via a suitable technique such as time-of-flight analysis, structured light analysis, stereo vision analysis, or other suitable techniques. In one embodiment, an acquired depth image may include a plurality of observed pixels, where each observed pixel has one or more observed depth values including depth information of the target as viewed from the source. The acquired depth image may optionally be represented as a pixel matrix that includes, for each pixel address, a depth value indicating a world space depth from the plane of the depth camera, or another suitable reference plane, to a surface at that pixel address. In one embodiment, the acquired depth image may be downsampled into a lower resolution image. In another embodiment, the acquired depth image may be filtered to remove and/or sooth one or more high-variance and/or noisy depth values. Such high-variance and/or noisy depth values in the acquired depth image may result from a number of different sources, such as random and/or systematic errors occurring during the image capturing process, defects and/or aberrations resulting from the capture device, etc.

In step 604, the one or more acquired depth images may be processed to distinguish foreground targets that are to be tracked from non-target objects or other background elements. As used herein, the term "background" is used to describe anything in an image that is not part of the one or more targets to be tracked. The background may include elements that are in front of (i.e., closer to the depth camera) than the one or more targets to be tracked. Distinguishing foreground elements that are to be tracked from background elements that may be ignored may increase tracking efficiency and/or simplify downstream processing.

In one embodiment, each data point (e.g., pixel) of the acquired depth image may be assigned a segmentation value (or index) that identifies that particular data point as belonging to a foreground element or to a non-target background element. Segmentation values may represent a discrete index value or a fuzzy index value indicating a probability that a pixel belongs to a particular target and/or background element. In one example, different segmentation values may be assigned to each of the one or more targets included within the foreground image. For example, pixels corresponding to a first game player can be assigned a player index equal to one, pixels corresponding to a second player can be assigned a player index equal to two, and pixels that do not correspond to a target player can be assigned a background index equal to zero. In another embodiment, pixels or other data points assigned a background index can be removed from consideration in one or more subsequent processing steps. In some embodiments, the process step of distinguishing foreground pixels from background pixels is omitted.

In step 606, foreground pixel assignment is performed. Foreground pixel assignment includes analyzing one or more foreground pixels to determine which of the one or more targets (including body parts and props) is likely to be associated with the one or more foreground pixels. A variety of different foreground pixel assignment techniques can be used to assess which of the one or more targets (or a machine representation of the one or more targets) a particular pixel is likely to belong. In one embodiment, both depth information and color information are used in determining which probabilities to assign to a particular foreground pixel or group of pixels.

In one embodiment, machine-learning can be used to assign each foreground pixel a target index and/or target probability distribution. The machine-learning approach analyzes a foreground object using information learned from analyzing a prior-trained collection of known poses (e.g., a training set of segmented images). In one example, a stateless approach can be used to assign each foreground pixel a target index or distribution without any prior context (i.e., knowledge of a prior frame is not needed). In some embodiments, the machine-learning approach to foreground pixel assignment may utilize one or more decision trees to analyze each foreground pixel of interest in an acquired depth image. Such analysis can determine a best-guess of the target assignment for that pixel and the confidence that the best-guess is correct.

In some embodiments, the best-guess may include a probability distribution over two or more possible targets, and the confidence may be represented by the relative probabilities of the different possible targets. At each node of a decision tree, an observed depth value comparison between two pixels is made, and, depending on the result of the comparison, a subsequent depth value comparison between two pixels is made at the child node of the decision tree. The result of such comparisons at each node determines the pixels that are to be compared at the next node. The terminal nodes of each decision tree results in a target classification and associated confidence in the classification.

In some embodiments, subsequent decision trees may be used to iteratively refine the best-guess of the one or more target assignments for each pixel and the confidence that the best-guess is correct. For example, once the pixels have been classified with the first classifier tree (based on neighboring depth values), a refining classification may be performed to classify each pixel by using a second decision tree that looks at the previous classified pixels and/or depth values. A third pass may also be used to further refine the classification of the current pixel by looking at the previous classified pixels and/ or depth values. It is to be understood that virtually any number of iterations may be performed, with fewer iterations resulting in less computational expense and more iterations potentially offering more accurate classifications and/or confidences.

In some embodiments, the decision trees may be constructed during a training mode in which a sample of known models in known poses (e.g., a training set of segmented images) are analyzed to determine the questions (i.e., tests) that can be asked at each node of the decision trees in order to produce accurate pixel classifications.

In one embodiment, foreground pixel assignment is stateless, meaning that the pixel assignments are made without reference to prior states (or prior image frames). One example of a stateless process for assigning probabilities that a particular pixel or group of pixels represents one or more objects is the Exemplar process. The Exemplar process uses a machine-learning approach that takes a depth image and classifies each pixel by assigning to each pixel a probability distribution over the one or more objects to which it could correspond. For example, a given pixel, which is in fact a tennis racquet, may be assigned a 70% chance that it belongs to a tennis racquet, a 20% chance that it belongs to a ping pong paddle, and a 10% chance that it belongs to a right arm. The Exemplar process may input millions of pre-classified training samples (e.g., segmented images), learn the relationships between sets of pixels within the pre-classified training samples, and generate a segmented image based on a particular depth image. In one example, the Exemplar process may produce a classification map in which pixels are classified with a probability of belonging to a particular object such as a body part or prop. The Exemplar process is further described in U.S. patent application Ser. No. 12/454,628, entitled "Human Body Pose Estimation," which application is herein incorporated by reference in its entirety.

In another embodiment, the Exemplar process and centroid generation are used for generating probabilities as to the proper identification of particular objects such as body parts and/or props. Centroids may have an associated probability that a captured object is correctly identified as a given object such as a hand, face, or prop. In one embodiment, centroids are generated for a user's head, shoulders, elbows, wrists, and hands. The Exemplar process and centroid generation are further described in U.S. patent application Ser. No. 12/825, 657, entitled "Skeletal Joint Recognition and Tracking System," and in U.S. patent application Ser. No. 12/770,394, entitled "Multiple Centroid Condensation of Probability Distribution Clouds." Each of the aforementioned applications is herein incorporated by reference in its entirety.

In step 607, one or more classification maps are generated. As shown in FIG. 6A, step 607 may receive input from steps 602, 604, and 606. In one embodiment, a first classification map is generated corresponding with body part targets and a second classification map is generated corresponding with prop targets. In another embodiment, a unified classification map is generated covering a plurality of targets, the plurality of targets includes both body part targets and prop targets. In one example of an approach for generating a unified classification map, a training set provided to a machine learning technique for implementing step 606 comprises segmented images including one or more body parts and one or more props. In one example, each pixel in a segmented image is identified as either a body part, an object, or background.

Figure 6B:
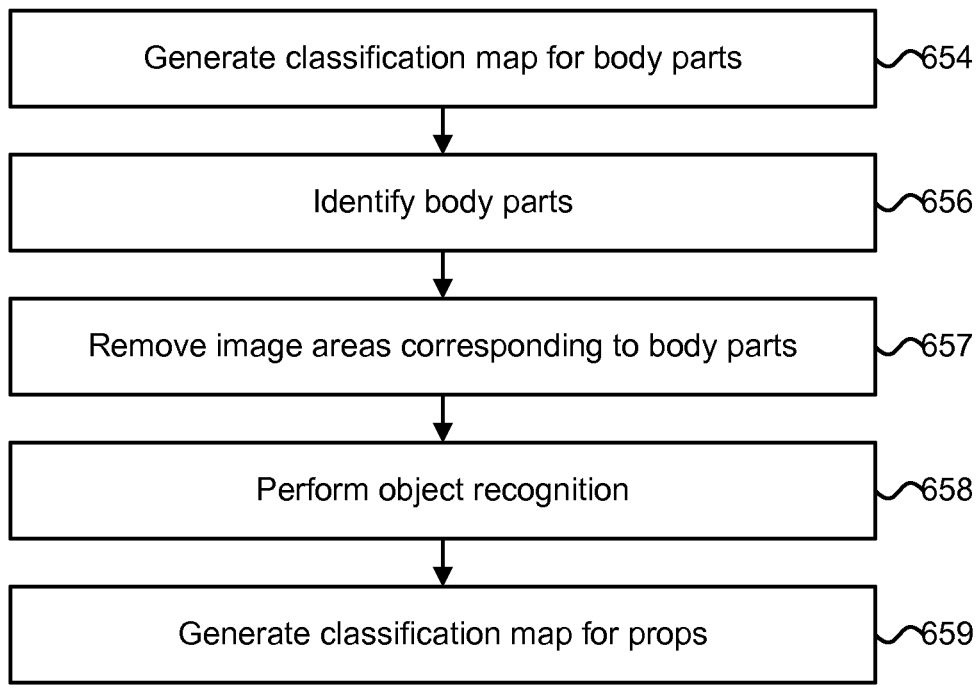
FIG. 6B is a flowchart describing one embodiment of a process for generating one or more classification maps.

FIG. 6B is a flowchart describing another embodiment of a process for generating one or more classification maps. The process described in FIG. 6B is only one example of a process for implementing step 607 in FIG. 6A. The process of FIG. 6B may be performed by one or more computing devices. Each step in the process of FIG. 6B may be performed by the same or different computing devices as those used in other steps, and each step need not necessarily be performed by a single computing device. In one embodiment, the process of FIG. 6B is performed by a game console.

In FIG. 6B, a classification map is generated from a depth image for body part targets. In one embodiment, the classification map of step 654 may be generated using the probability assignments of step 606, whereby foreground pixels are assigned probabilities of belonging to one or more body part targets. In step 656, body parts may be identified from the classification map generated in step 654. In one embodiment, a particular body part is identified if a probability assigned to one or more pixels is greater than 90% that the one or more pixels represent the particular body part. In step 657, the identified body parts are removed from the depth image (or a derivative of the depth image). In some embodiments, the background may also be removed. In step 658, object recognition is performed on the depth image with the identified body parts removed to identify one or more props. In one embodiment, the Exemplar process may be used to perform object recognition. Other suitable object recognition techniques may also be used. In step 659, a classification map for the one or more props is generated based on the results of step 658. One benefit of performing step 606 using a training set without props followed by an object recognition process is that the object recognition process of step 658 may be more efficient at detecting objects compared with performing step 606 using a training set including props.

Figure 6C:
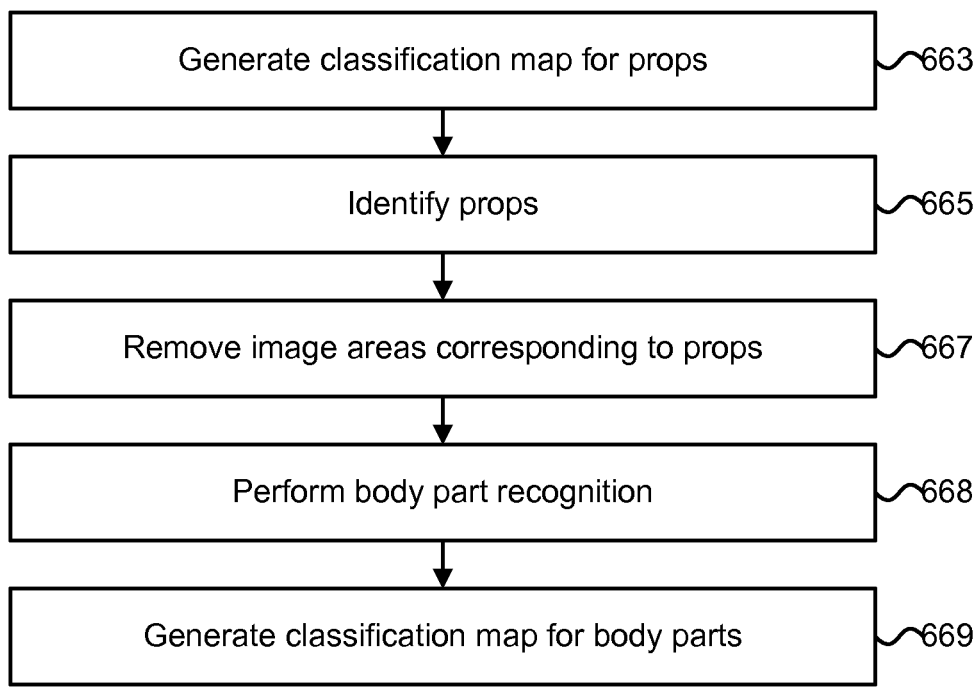
FIG. 6C is a flowchart describing one embodiment of a process for generating one or more classification maps.

FIG. 6C is a flowchart describing another embodiment of a process for generating one or more classification maps. The process described in FIG. 6C is only one example of a process for implementing step 607 in FIG. 6A. The process of FIG. 6C may be performed by one or more computing devices. Each step in the process of FIG. 6C may be performed by the same or different computing devices as those used in other steps, and each step need not necessarily be performed by a single computing device. In one embodiment, the process of FIG. 6C is performed by a game console.

In FIG. 6C, a classification map is generated from a depth image for prop targets. Prop targets may include active props and/or passive props. In one embodiment, the classification map of step 663 may be generated using the probability assignments of step 606, whereby foreground pixels are assigned probabilities of belonging to one or more prop targets. In step 665, props may be identified from the classification map generated in step 663. In one embodiment, a particular prop is identified if a probability assigned to one or more pixels is greater than 90% that the one or more pixels represent the particular prop. In step 667, the identified props are removed from the depth image (or a derivative of the depth image). In some embodiments, the background may also be removed. In one embodiment, the pixels associated with one or more removed props are assigned a "don't care" value. The "don't care" value may be used by subsequent processing steps to ignore the depth information associated with the removed pixels. This information may be helpful to subsequent classification steps because the removed pixels may have been associated with one or more props that may have been in front of body parts (i.e., the body parts being recognized or classified in a subsequent processing step may have been occluded by one or more props). In step 668, object recognition is performed on the depth image with the identified props removed to identify one or more body parts. In one embodiment, the Exemplar process may be used to perform object recognition. In one example, steps 604 and 606 may be used with a new training set including segmented images of body parts. Other suitable object recognition techniques may also be used. In step 669, a classification map for the one or more body parts is generated based on the results of step 668.

Referring back to FIG. 6A, in step 610, model resolution and tracking is performed. In one embodiment, model resolution and tracking includes model fitting 608, skeletal tracking 620, and prop tracking 622. In one embodiment, model resolution and tracking 610 may receive one or more classification maps, the one or more classification maps based on one or more raw depth images from step 602, foreground/background information from step 604, and foreground pixel probability assignments from step 606.

In one embodiment, model fitting 608 is used to fit one or more possible computer models onto one or more acquired images and/or one or more classification maps. The one or more computer models may comprise machine representations of a modeled target (e.g., machine representations of a body part or prop). In some embodiments, model fitting involving line, plane, or more complex geometries may be applied to track an object in three dimensional space. In some examples, a model may include one or more data structures that represent a target as a three dimensional model comprising rigid and/or deformable shapes, or body parts. Each target (e.g., a human and/or prop) or portion of a target may be characterized as a mathematical primitive, examples of which include, but are not limited to, spheres, anisotropically-scaled spheres, cylinders, anisotropic cylinders, smooth cylinders, boxes, beveled boxes, prisms, and the like. In some examples, a target may be modeled using a parameterized three dimensional model. In some examples, a model may include negative spaces (i.e., a space where nothing should be). In one example, a steering wheel containing empty spaces is modeled with a three dimensional model including negative spaces associated with the empty spaces. In another example, a space at the end of a baseball bat is modeled using a negative space.

In one embodiment, during model fitting 608, a human target is modeled as a skeleton including a plurality of skeletal points, each skeletal point having a three dimensional location in world space. The various skeletal points may correspond to actual joints of a human target, terminal ends of a human target's extremities, and/or points without a direct anatomical link to the human target. Each skeletal point has at least three degrees of freedom (e.g., world space x, y, z). In one example, a skeleton with 31 skeletal points can be defined by 93 values.

In some embodiments, various model fitting approaches may use depth information, background information, prop information, body part information, and/or prior trained anatomical and kinetic information to map the one or more computer models onto an acquired image. For example, body part information may be used to find one or more candidate locations for one or more skeletal bones. Subsequently, a plurality of plausible skeletons may be assembled to include skeletal bones at different combinations of the one or more candidate locations. The various plausible skeletons may then be scored, and the scored proposals can be combined into a final estimate. In one embodiment, model fitting 608 includes two components: a body part proposer, which extracts candidate locations from foreground pixel assignment 606 for each body part independently (e.g., finding candidate centroids for each body part); and a skeleton generator, which combines these candidates into complete skeletons.

Referring back to FIG. 6A, in one embodiment, the process for detecting and tracking one or more targets may be implemented by a target proposal system and a target tracking system. The target proposal system may implement steps 602, 604, 606, and 607 in order to identify one or more candidate targets. The one or more candidate targets may be identified within one or more classification maps. The target tracking system may implement steps 610 and 612 in order to reconcile one or more candidate targets and report correctly identified targets. In one example, the skeletal tracking system 620 consumes the one or more candidate targets that are assigned as candidate body parts and the prop tracking system 622 consumes the one or more candidate targets that are assigned as candidate props. In another example, the skeletal tracking system 620 consumes a first classification map associated with one or more candidate body parts and prop tracking system 622 consumes a second classification map associated with one or more candidate props.

Referring back to FIG. 6A, in one embodiment, the skeletal tracking system 620 works by connecting the one or more body part proposals (or candidates) in various ways to produce a large number of (partial or whole) skeletal hypotheses. In order to reduce computational complexity, certain parts of a skeleton (such as the head and shoulders) might be resolved first, followed by others (such as the arms). These skeletal hypotheses are then scored in various ways, and the scores and other information are used to select the best hypotheses and reconcile where the correct body parts actually are. Similarly, prop tracking system 622 considers the one or more prop proposals (or candidates), generates prop hypotheses, scores the generated prop hypotheses, and selects the best hypothesis in order to determine the correct prop. In one embodiment, the position and/or orientation of one or more previous high scoring hypotheses from previous images is used to help score the generated hypotheses in step 610. For example, a previous determination of the position and orientation of a tennis racquet in a previous image may be used to score the position and orientation of the tennis racquet in a current image.

In one embodiment, feedback may occur between the skeletal tracking system 620 and the prop tracking system 622. In one example, the skeletal tracking system 620 receives prop tracking information from prop tracking system 622. The prop tracking information includes position and orientation information regarding one or more props. The prop tracking information is taken into account when scoring generated skeletal hypotheses. For example, a scored hypothesis may be rewarded if the position of a particular object (e.g., a tennis racquet or baseball bat) is in proximity with a particular body part (e.g., a hand or arm). The position may be either a 3-D location in a three dimensional space or a 2-D location in a two dimensional space. Similarly, the score given to a particular hypothesis may be lowered (or penalized) if a particular object is not within a threshold distance of a particular body part typically associated with the particular object. In some embodiments, the reward or penalty given to a particular cost function (e.g., the score given to a particular body part hypothesis) may be linear or non-linear.

In another example, the prop tracking system 622 receives skeletal tracking information from skeletal tracking system 620. The skeletal tracking information includes position and orientation information regarding one or more body parts. The skeletal tracking information is taken into account when scoring generated prop hypotheses. For example, a scored hypothesis may be rewarded if the position of a particular body part (e.g., a head) is in proximity with a particular prop (e.g., a hat). The position may be either a 3-D location in a three dimensional space, or a 2-D location in a two dimensional space. Similarly, the score given to a particular hypothesis may be lowered (or penalized) if a particular body part is not within a threshold distance of a particular prop typically associated with the particular body part. In some embodiments, the reward or penalty given to a particular cost function (e.g., the score given to a particular prop hypothesis) may be linear or non-linear. Feedback data regarding a user's body may be particularly helpful in reacquiring an object in situations where tracking objects is difficult (e.g., when an object quickly enters and leaves a field of view or moves at a high speed relative to the ability of a capture device to capture the motion of the object). For example, in the case of a game player swinging a baseball bat, if tracking of the bat is lost, then the handle of the baseball bat may be reacquired by considering the location of the game player's hands. In some embodiments, prop tracking 622 is performed in parallel with skeletal tracking 620.

In step 612, the determination of the correctly identified targets from step 610 is reported and available for use by other applications. Reporting can be performed in any suitable manner. In one example, an application programming interface (API) may be used to report the one or more selected targets. For example, such an API may be configured to communicate the positions, velocities, accelerations, confidences in positions, velocities, and/or accelerations, and/or other information related to the one or more selected targets.

Figure 7:
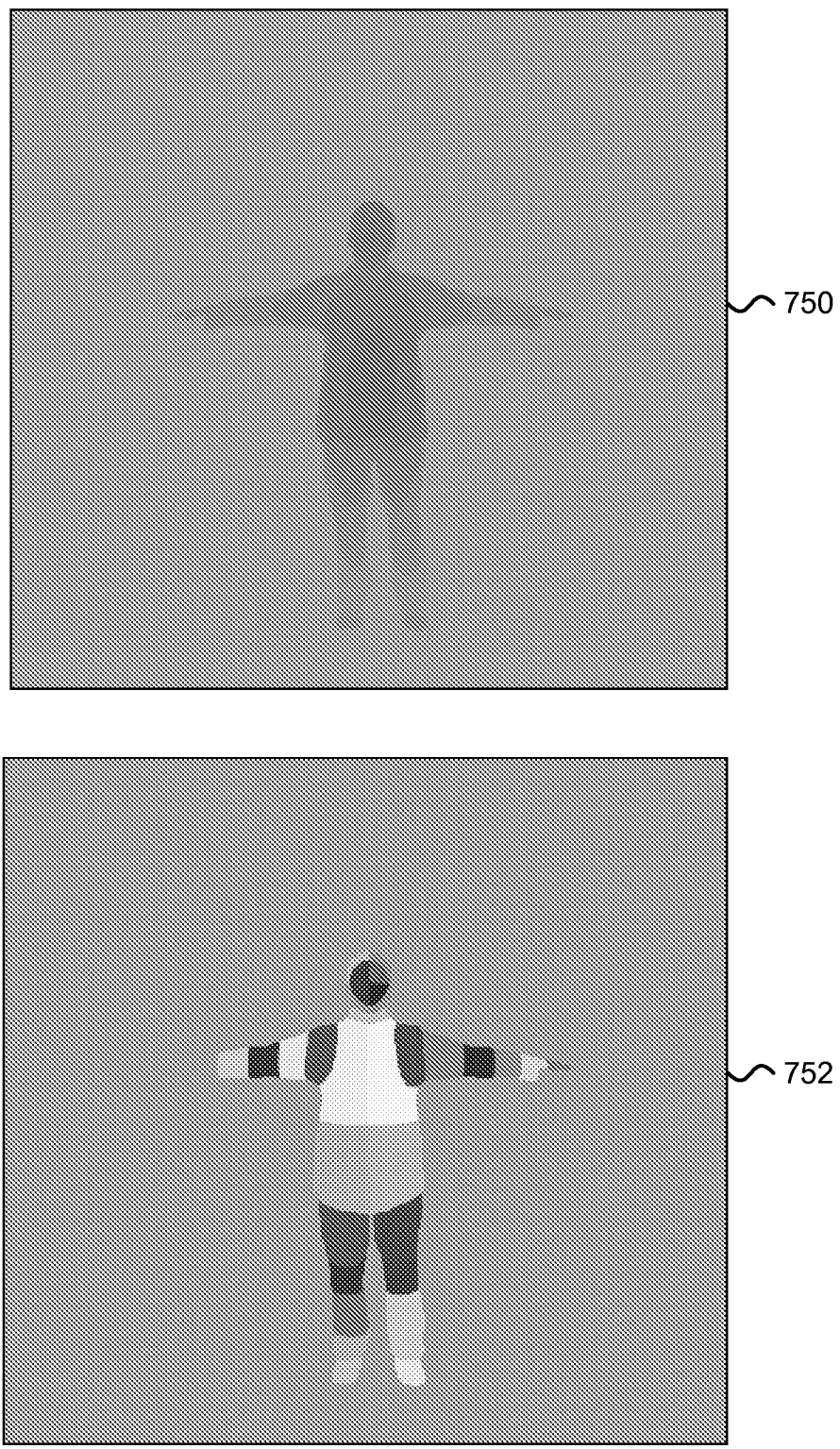
FIG. 7 depicts an original image and a corresponding segmented image.

FIG. 7 depicts an original image 750 and a segmented body image 752 based on the original image 750. In one embodiment, segmented body image 752 distinguishes one or more pixel regions associated with a particular body part target by assigning a particular color to each of the one or more pixel regions. Original image 750 may come from a number of sources including a capture device, such as capture device 20 in FIG. 2, or a graphics package or other 3-D rendering program. In one embodiment, original image 750 represents a particular pose from a user such as user 18 in FIGS. 1A-1C. In one embodiment, the target detection and tracking system 10 of FIG. 2 may receive original image 750 and generate segmented body image 752 using the processes described with respect to FIG. 6A. In one example, a classification map generated by step 607 of FIG. 6A may comprise a segmented image. In one embodiment, one or more segmented images, each comprising a particular pose, may be used as part of a training set (i.e., training examples) for a machine-learning approach. The training set may include thousands, millions, or any number of segmented images.

In one embodiment, one or more training images of a training set may be retrofitted with 3-D models of a particular object or prop. The 3-D models may include one or more data structures that represent a particular target as a three dimensional shape. In another embodiment, one or more training images of a training set may be rendered using 3-D models of a particular object or prop.

In FIG. 8, three training images 942, 944, and 946 have been retrofitted with 3-D models of various props. Segmented image 942 has been retrofitted with a tennis racquet. Segmented image 944 has been retrofitted with a sword. In this case, because the object is inter-penetrating the user's body, the retrofitted segmented image may be discarded from the training set. Segmented image 946 has been retrofitted with a baseball bat. Retrofitting an existing training set of human poses with props and/or auto-generating a new training set including props based on an existing training set of human poses may be less expensive than creating a new motion captured training set involving human poses and props. In some embodiments, the objects or props in a training image are not touching or being held by a human subject. For example, a ball being passed between two game players will be in mid-air and not in direct contact with either player.

As there is a trade-off between the number of body parts and objects that can be detected simultaneously, in some embodiments, the number of body part targets may be limited. For example, rather than searching for 32 different body parts, the body part targets may include only the head, neck, left and right shoulders, left and right upper torso, and upper and lower arms and hands. In some embodiments, one or more prop targets may include multiple parts. For example, a tennis racquet may be composed of a racquet handle and a racquet head.

Figure 9A:
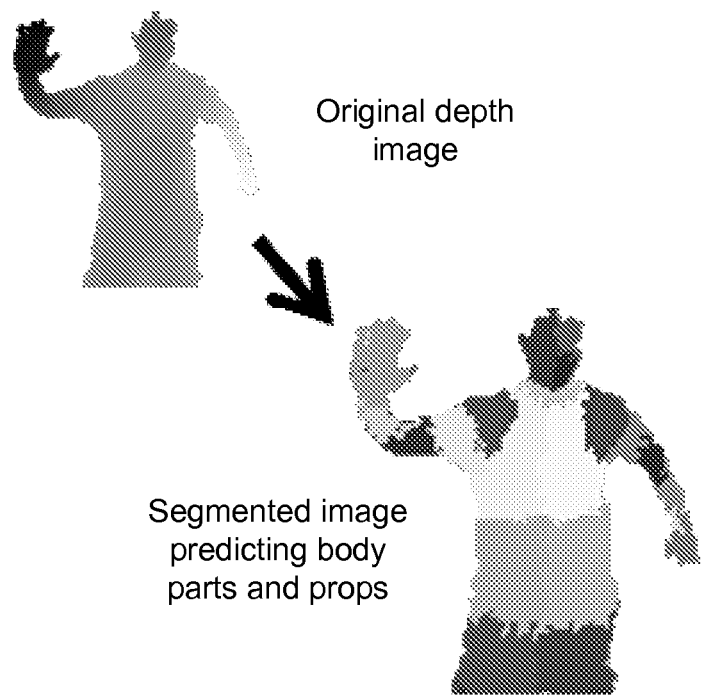
Figure 9B:
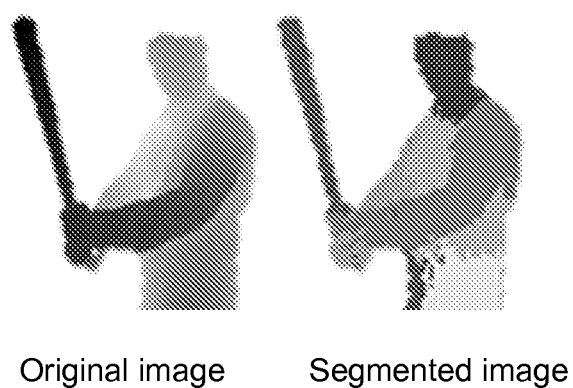

Once a detection and tracking system such as detection and tracking system 10 of FIG. 2 has been trained with a training set including segmented body parts and props, classification maps including classifications for both body part targets and prop targets may be generated. In FIG. 9A, an original depth image of a human wearing a glove is used to generate a segmented image including both predicted body parts and props. As shown in the segmented image of FIG. 9A, the glove in the user's right hand is classified as a target along with a plurality of body part targets (e.g., left and right shoulders). In FIG. 9B, an original depth image of a user holding a baseball bat is used to generate a segmented image where the baseball bat is classified as a target.

In one embodiment, multiple props may be classified along with multiple body parts. In FIG. 9C, a depth image 912 of a user holding a baseball bat and throwing a soccer ball into the air is used to generate a segmented image 916 where both the baseball bat and soccer ball are classified as targets. In one embodiment, color and/or pattern information received from a capture device may be used to help further distinguish targets that are similar in shape and size. In one example, a basketball and a soccer ball may be distinguished based on color information. In another example, a soccer ball pattern comprising alternating black pentagons and white hexagons may be used to help distinguish a soccer ball from other objects of similar shape and size.

In one embodiment, the detection and/or tracking of a user picking up, choosing, or introducing into a field of view a particular prop may trigger an application to select a particular application mode. In one example, a game player picking up a soccer ball will cause a sports application to select a game mode associated with the soccer ball. In another example, a particular game may allow a game player to select and use three different objects (e.g., a gun, a baseball bat, and a chainsaw) based on which of the one or more associated props are being held by the game player. In one embodiment, a game player may use introduce one or more props in the middle of a game session.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting one or more targets, comprising:
   acquiring one or more depth images from one or more depth sensing image sensors, a first depth image of the one or more depth images includes a plurality of pixels;
   generating a classification map associated with the first depth image, the generating includes assigning to one or more pixels of the plurality of pixels a probability that the one or more pixels is associated with a particular target of the one or more targets, the one or more targets include a first target representing at least a portion of a first body part and a second target representing at least a portion of a first prop;
   fitting at least one computer model of one or more computer models onto at least a portion of the classification map, the one or more computer models include at least a first model of the first target and at least a second model of the second target;
   performing skeletal tracking on the first target;
   performing prop tracking on the second target; and reporting a first position of the first target and a second position of the second target, the performing skeletal tracking includes receiving position information regarding the second target, the position information is taken into consideration when determining the first position of the first target.

2. The method of claim 1, wherein:
the first prop is an inanimate object; and
the performing skeletal tracking includes receiving prop tracking information associated with the first prop, the prop tracking information includes orientation information associated with the second target and the position information associated with the second target, the performing skeletal tracking includes determining the first position of the first target based on the prop tracking information.

3. The method of claim 1, wherein:
the generating a classification map is performed using a machine learning technique, the machine learning technique uses a training set of segmented images, the training set of segmented images includes one or more retrofitted images.

4. The method of claim 2, wherein:
the performing skeletal tracking includes scoring generated skeletal hypotheses based on the prop tracking information.

5. The method of claim 1, wherein:
the performing prop tracking includes receiving additional position information regarding the first target, the additional position information is taken into consideration when determining the second position of the second target.

6. The method of claim 1, further comprising:
switching a game mode based on the reporting, the first prop comprises a gaming prop.

7. The method of claim 1, further comprising:
receiving orientation information from the first prop, the performing prop tracking uses the orientation information to help track the first prop.

8. The method of claim 1, wherein:
the second model includes one or more negative spaces.

9. An electronic device for detecting one or more targets, comprising:
a depth sensing camera, the depth sensing camera captures a first depth image; and
one or more processors, the one or more processors in communication with the depth sensing camera, the one or more processors generate one or more classification maps associated with one or more body parts and one or more props, the one or more processors track the one or more body parts using skeletal tracking, the one or more processors track the one or more props using prop tracking, the one or more processors report metrics regarding the one or more body parts and the one or more props, the metrics include a first position of a first body part of the one or more body parts and a second position of a second prop of the one or more props, the skeletal tracking includes receiving position information associated with the second prop, the position information is taken into consideration when determining the first position of the first body part.

10. The electronic device of claim 9, wherein:
the one or more classification maps are generated using a machine learning technique, the machine learning technique uses a training set of segmented images, the training set of segmented images includes one or more retrofitted images.

11. The electronic device of claim 9, wherein:
the prop tracking includes using skeletal tracking information when scoring prop hypotheses.

12. The electronic device of claim 9, wherein:
the skeletal tracking includes using prop tracking information when scoring skeletal hypotheses, the prop tracking information includes orientation information associated with the second prop and the position information associated with the second prop, the second prop is an inanimate object.

13. The electronic device of claim 9, further comprising:
a color sensing camera, the color sensing camera captures a first color image, the one or more processors receive at least a portion of the first color image, the one or more processors use color information from the at least a portion of the first color image to distinguish targets of the one or more targets that are similar in size and shape.

14. The electronic device of claim 9, wherein:
at least one prop of the one or more props is an active prop; and
the prop tracking is performed in parallel with the skeletal tracking.

15. One or more storage devices containing processor readable code for programming one or more processors to perform a method comprising the steps of:
acquiring one or more depth images from one or more depth sensing image sensors, a first depth image of the one or more depth images includes a plurality of pixels;
generating a classification map associated with the first depth image, the generating includes assigning to one or more pixels of the plurality of pixels a probability that the one or more pixels is associated with a particular target of one or more targets, the one or more targets include a first target representing at least a portion of a first body part and a second target representing at least a portion of a first prop, the first prop is an inanimate object;
performing skeletal tracking on the first target, the performing skeletal tracking includes receiving position information regarding the second target, the position information is taken into consideration when determining a first position of the first target;
performing prop tracking on the second target, the performing prop tracking includes receiving additional position information regarding the first target, the additional position information is taken into consideration when determining a second position of the second target; and
reporting the first position of the first target and the second position of the second target.

16. The one or more storage devices of claim 15, wherein:
the generating a classification map is performed using a machine learning technique, the machine learning technique uses a training set of segmented images, the training set of segmented images includes one or more retrofitted images.

17. The one or more storage devices of claim 16, wherein:
at least one of the one or more retrofitted images includes a plurality of props, the plurality of props includes the first prop.

18. The one or more storage devices of claim 17, wherein:
the first prop is an active prop.

19. The one or more storage devices of claim 18, further comprising:
    fitting at least one computer model of one or more computer models onto at least a portion of the classification map, the one or more computer models include at least a first model of the first target and at least a second model of the second target, the second model includes one or more negative spaces.

20. The one or more storage devices of claim 19, wherein:
    the reporting causes the one or more processors to select a new game mode, the first prop comprises a gaming prop.

* * * * *